US005691491A

United States Patent [19]

DeGomez

[11] Patent Number: 5,691,491

[45] Date of Patent: Nov. 25, 1997

[54] VACUUM FORMED GUITAR BACKS

[76] Inventor: David DeGomez, 325 Normandy, Norwood, Mass. 02062

[21] Appl. No.: 600,536

[22] Filed: Feb. 13, 1996

[51] Int. Cl.$^6$ .......... G01D 3/00

[52] U.S. Cl. .......... 84/291; 84/267; 425/388; 425/438

[58] Field of Search .......... 84/291, 267, 293; 425/388, 438, DIG. 58

[56] References Cited

U.S. PATENT DOCUMENTS 3,290,418 12/1966 Best .......... 264/553
3,722,345 3/1973 Dopera .......... 84/291
4,090,427 5/1978 Kaman .......... 84/291

*Primary Examiner*—Michael L. Gellner
*Assistant Examiner*—Shih-yung Hsieh

[57] ABSTRACT

A back shell for guitars or similar musical instruments having sides that at the rim turn inward and then outward to produce a flange that the soundboard can be adhered to. With multi-part tooling, the back shell can be produced at a very low cost from sheet plastics using the vacuum form method of manufacture.

7 Claims, 4 Drawing Sheets

VACUUM FORMED GUITAR BACKS

BACKGROUND OF THE INVENTION

The history of manufacturing acoustic guitars with plastics is a long and checkered one. The advantages of using plastics in string instrument construction must seem obvious. Traditional wooden guitars are made from numerous different parts, many parts hand crafted by skilled artisans. The wood itself must be carefully selected and once the instrument is finished the wood can become unstable when the temperature or humidity changes. Plastics on the other hand can be quickly and economically cast in complex shapes that remain stable under a wide variety of conditions.

Beginning in the early fifties thousands of children learned the basics of playing fretted instruments on injection molded Maccaferri ukeleles (U.S. Pat. No. 2,597,154). But while these little instruments were more than adequate to the task of initiating budding musicians, Maccaferri's full sized, injection molded guitars didn't catch on with serious performers. Today the only successful use of plastics in acoustic guitar manufacturing is the Ovation guitar made by the Kaman Co (U.S. Pat. No. 4,090,427). The Ovation uses a carbon fiber, (originally fiberglass and polyester) bowl shaped back, joined to a more traditional wood top.

But even the Ovation construction technique has drawbacks. Hand lay up of fiber and resin requires a skilled craftsman and lengthy preparation time. Automated chopped fiber and resin spray guns speed lay up time but are costly. Once lay up is complete, cure time is lengthy, requiring multiple molds to increase production.

The present invention uses thermal forming plastic sheet and the vacuum forming process to greatly speed up and lower the cost of manufacturing the body portion of acoustic guitars. The Vacuum form process requires only the time it takes to heat and cool a sheet of plastic, typically four to twelve minutes. Vacuum form equipment can be as simple as a frame to hold the plastic, an oven large enough to accommodate the plastic, and a table with a hole in the center with the vacuum pump connected to the hole in the table by means of pipe or hose. Completely automated Vacuum form machines require that the operator simply feed a sheet of plastic into the machine at the beginning of a cycle and remove the formed part at the end of the cycle.

In the vacuum forming process a sheet of plastic is heated until it becomes pliable and elastic. After stretching the plastic over a tool the air between the plastic and the tool is evacuated by means of a vacuum pump. Atmospheric pressure forces the plastic against the tool. When the plastic cools, it retains the shape of the tool, and, if adequate draft has been provided, the newly created part can be removed from the tool and the excess material trimmed away.

EXPERIMENTS LEADING TO THE PRESENT INVENTION

The first experiment involved the simplest of vacuum forming methods; mold less thermo forming. An aperture was cut in a rectangle of ¾" plywood, the size and shape of the traditional guitar body. This piece of plywood then formed the top of a 7" deep plywood box. A vacuum line was then connected to the box. In addition, a block of wood, 6" long by 2" wide by 5" high was secured in the box in the area where the neck of the guitar would join the body. A sheet of 3/16" thick PET-G plastic (trade name "vivak") was heated in an oven until it became soft and pliable. The softened plastic sheet was placed over the box, and when the air was pumped out of the box, atmospheric pressure forced the plastic through the aperture into the box. With the correct amount of vacuum, when the plastic cooled back to it's hardened state, it formed a guitar back with rounded sides and back. A shelf was created at the neck end where the plastic draped around the 6"×2"×5" wood block.

To provide adequate bonding area for the body to sound board joint, excess plastic was trimmed to create a ½" lip around the rim of the body. Material was also trimmed flush with the the neck shelf to allow clearance for the neck.

A sound board of the traditional flat top style was bonded with hot melt glue to the body. A "bolt on" neck 2 of the type typically found on solid body electric guitars was bolted to the neck shelf and the guitar was strung with a set of medium gage strings.

With the strings under tension, it was found the body was not stiff enough to control the rotation of the peg box toward the bridge. To counteract this movement an aluminum bar 6 3/16"×½" in cross section was attached to the side of the neck where it joins the body, extending the length of the body, and secured to the wall of the body just below the sound board. The screw holding the aluminum bar in place at the wall opposite the neck is also in a perfect position to secure the customary strap button 7.

The resulting guitar was adequate to prove the feasibility of using the Vacuum form process but was not without a serious flaw. The turned out lip, necessary in bonding the sound board to the body, reduced the volume of the sound chamber, and also make the instrument uncomfortable to hold when playing.

To overcome these problems, the following changes were made to the original setup. The depth of the box was reduced to 5", the thickness of a typical guitar body. The inside edges of the aperture were chamfered 45° and the aperture plate itself spit in two symmetrical pieces. Sheet metal strips were bent to form a wall that joined the obtuse angle of the aperture chamfer to the bottom of the box.

After the plastic was vacuumed into this female mold cavity, the aperture plate was removed, along with the part (the part being trapped by the chamfered edge). The two halves of the plate were separated, freeing the part. With sides exhibiting a "turn around lip" 9 at the sound board, the resulting instrument has a sound chamber having the same volume as a traditional guitar. And, except for the triangular gap under the sound board, it very much much resembles the traditional guitar.

The last experiment involved the use of a male tool. First a blank of very high density urethane foam (chosen for the ease at which it can be shaped), was cut on a band saw to the outline of the guitar body. One edge was chamfered at 45°, to create the turn around lip. The other edge was given a 1½" radius, to make a stronger part, and to make the guitar more comfortable to hold. After shaping, the foam was sealed with a high temperature epoxy coating. If the tool had been used at this point, the tool would become trapped in the plastic by the turn around lip. Instead the tool was first band sawed into a number of drafted pieces and then reassembled on the vacuum box. Waxed cardboard shims were placed between the pieces to make up for the material removed when the tool was sawed in pieces. Cellophane tape lightly held the tool together on the vacuum box.

After the part was formed and the plastic cooled, the part, with the tool still inside, was turned upside down and those pieces of tool in the center, unencumbered by the turn around lip, were removed. The pieces around the circumference were then slid toward the now empty center and removed. The waxed cardboard shims aided in sliding the tool pieces against each other. As this last instrument didn't have the neck shelf built in, a block of wood 5 provided the correct spacing between the bolt on neck and the back of the body. An opening for the neck 8 was cut level with the block 5.

Figure 1:
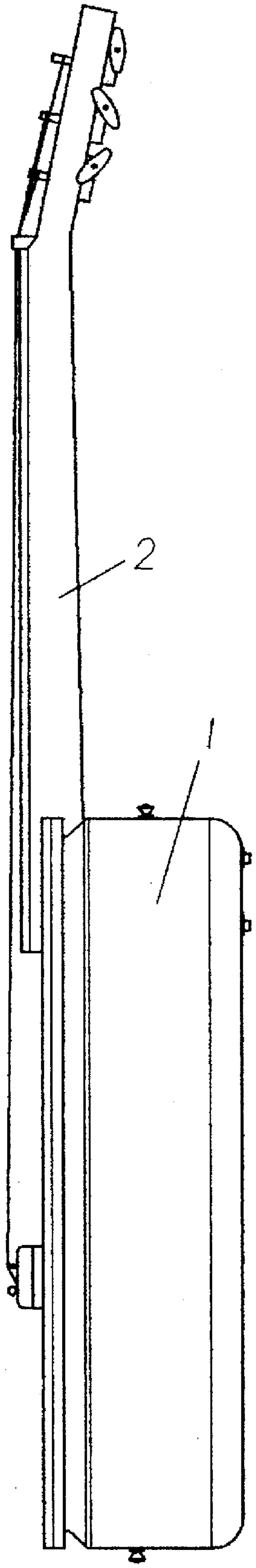
FIG. 1 is a side view of the complete instrument.
Figure 2A:
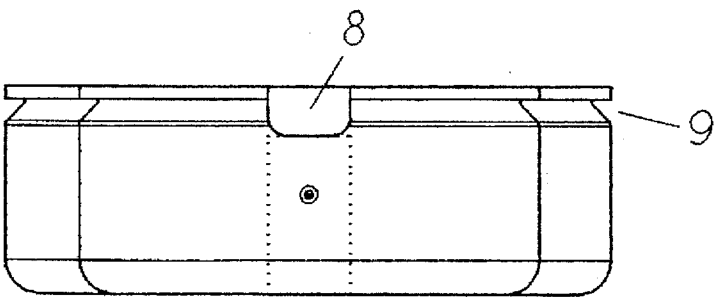
FIG. 2*a* is a top end view of the back shell only.
Figure 2B:
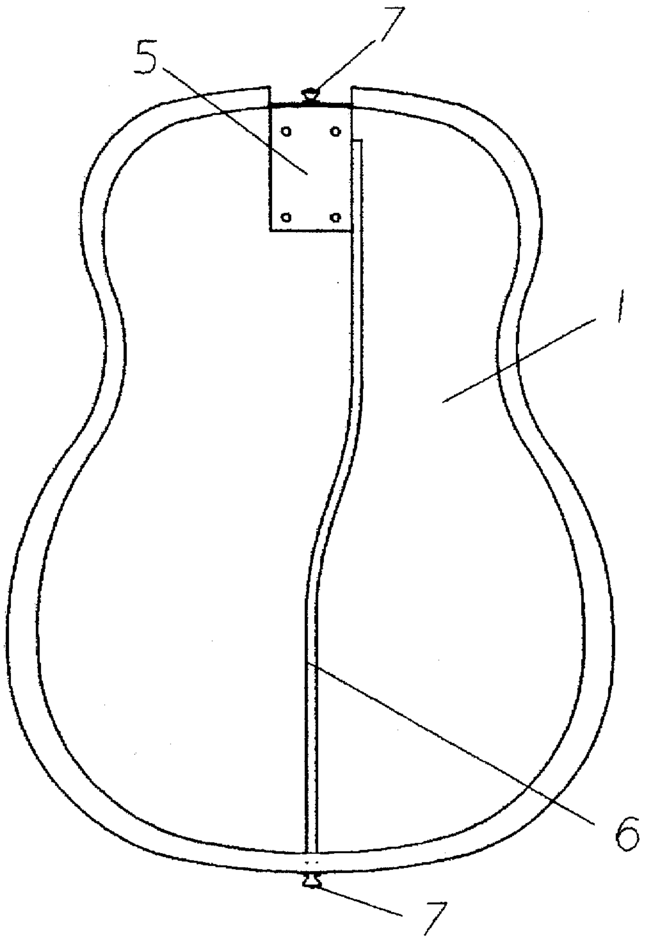
FIG. 2*b* is a front view of the back shell only.
Figure 2C:
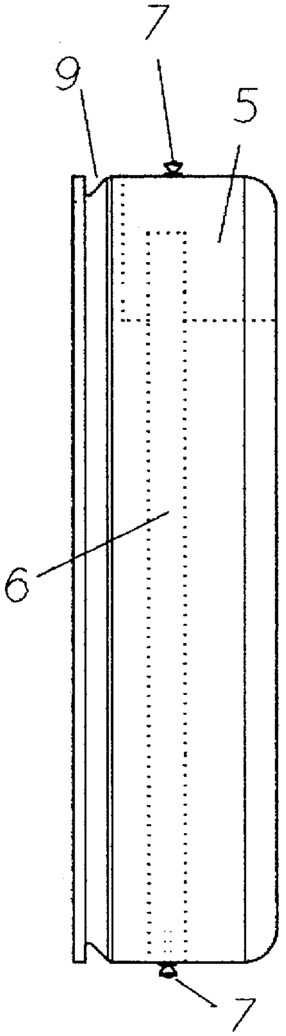
FIG. 2*c* is a side view of the back shell only.
Figure 3A:
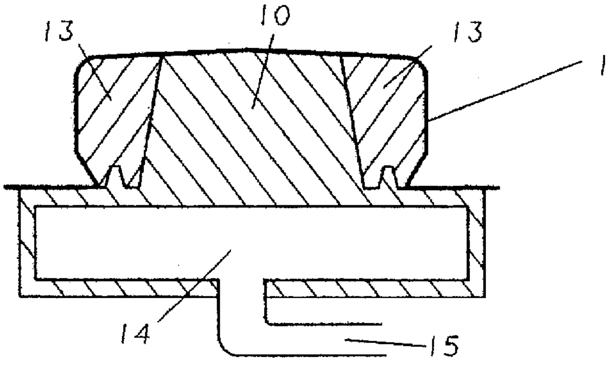
FIGS. 3*a*, 3*b*, and 3*c* are vertical cross-sections of a male tool and part.
Figure 3B:
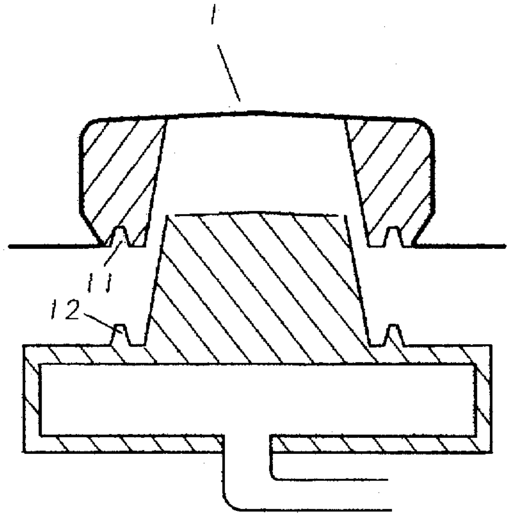
Figure 3C:
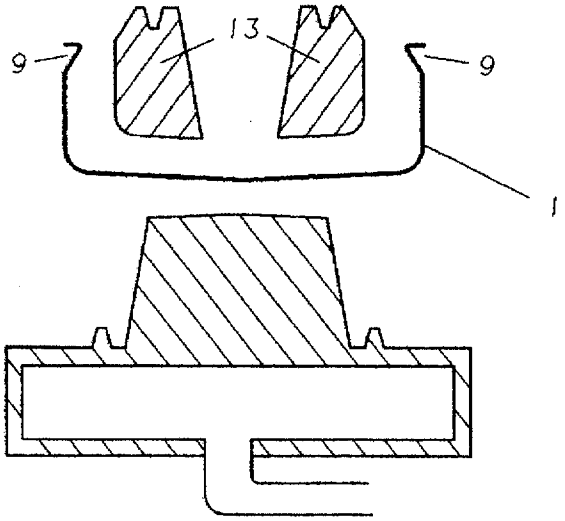

For high production manufacturing either the male or female tool can be made of more durable materials. A male tool—FIG. 3*a*—can be made of aluminum, or pattern makers pine. To speed removal and reassembly of the tool between parts the center section 10 of the male tool can be firmly attached to vacuum box 14 so that when the vacuum line 15 is shut off and the cooled plastic—1—is lifted off the box—FIG. 3*b*—the center section remains in position on the vacuum box. Peripheral pieces of the tool 13 can be located on the vacuum box with drafted pins—12—attached to the vacuum box corresponding to pockets—11—in the tool pieces.

Figure 4A:
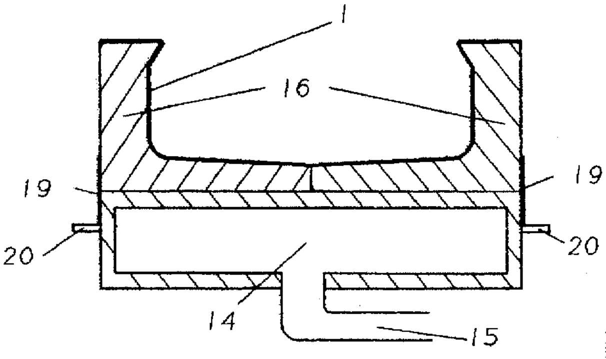
FIGS. 4*a*, 4*b*, and 4*c* are vertical cross-sections of a female tool and part.
Figure 4B:
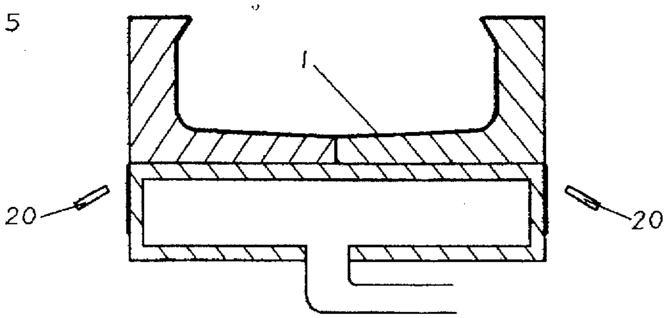
Figure 4C:
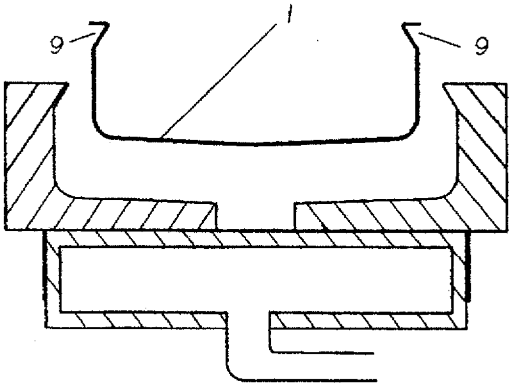

A durable female tool FIG. 4*a* can be made by first making a positive pattern of high density foam, then investing the pattern in an aluminum filled tooling epoxy. After the epoxy is cured the tool and pattern are cut length wise and the pattern removed. The two tool halves 16 of the tool can be held together and in position on the vacuum box 14 with a collar 19 extending a short distance above and below the top of the box and secured with removable pins 20. "After the plastic is vacuumed into the tool the pins are removed and the collar lowered FIG. 4*b*, allowing the two halves of the tool to be separated FIG. 4*c* and the part—1—removed."

I claim:

1. A back shell for a stringed musical instrument comprising:

A back portion;

a plurality of sidewall portions extending transverse to the back portion so that the back portion and sidewall portions form a U-shaped cross section having an interior between opposing sidewall portions; and a lip structure for attaching a soundboard, the lip structure extending transverse to said plurality of sidewall portions and outwardly away from said interior.

2. The back shell of claim 1, wherein said sidewall portions include an angled portion adjacent to the lip structure and extending toward said interior.

3. The back shell of claim 2, wherein said lip structure extends away from said interior less than an outermost part of the sidewall portions.

4. The back shell of claim 1, wherein said back shell is formed by vacuum molding.

5. A stringed musical instrument comprising:

a back shell;

a soundboard attached to a front of said back shell;

a neck extending from said back shell substantially parallel to a plane of said soundboard; and a plurality of strings extending from an end of said neck away from said back shell to said soundboard;

wherein said back shell includes;

a back portion extending parallel and spaced from said soundboard;

a plurality of sidewall portions extending transverse to the back portion so that the back portion and sidewall portions form a U-shaped cross section having an interior between opposing sidewall portions; and a lip structure for attaching said soundboard, the lip structure extending transverse to said plurality of sidewall portions and outwardly away from said interior.

6. The stringed musical instrument of claim 5, wherein said sidewall portions of said back shell include an angled portion adjacent to the lip structure and extending toward said interior.

7. The stringed musical instrument of claim 5, wherein said back shell is formed by vacuum molding.

* * * * *